United States Patent
Partzsch

[15] 3,670,569
[45] June 20, 1972

[54] FLIGHT MEASURING APPARATUS

[72] Inventor: Peter Partzsch, Friedrichshafen-Manzell, Germany

[73] Assignee: Dornier A.G., Friedrichshafen, Bodensee, Germany

[22] Filed: Jan. 15, 1971

[21] Appl. No.: 106,817

Related U.S. Application Data

[63] Continuation-in-part of Ser. No. 871,759, May 2, 1969, abandoned, which is a continuation of Ser. No. 505,150, Oct. 25, 1965, abandoned.

[30] Foreign Application Priority Data

Nov. 25, 1964 Germany.................................D 45912

[52] U.S. Cl......................................73/180, 73/187, 73/189
[51] Int. Cl..........................................................G01c 23/00
[58] Field of Search....................73/178, 180, 181, 185, 187, 73/189, 212

[56] References Cited

UNITED STATES PATENTS 2,662,402 12/1953 Ince, Jr. et al............................73/180
3,548,654 12/1970 Cole, Jr. ....................................73/187

*Primary Examiner*—Donald O. Woodiel
*Attorney*—James E. Bryan

[57] ABSTRACT

This invention relates to an apparatus for simultaneously measuring the angle of incidence, the angle of sideslip, distance covered along a flight path and air speed of an aircraft which comprises a body, a rotatable nose portion mounted on the body and having propeller blades thereon, a tail assembly mounted on the body, a support for connection to an associated aircraft, a Cardan joint mounted in the body in the center of gravity of the apparatus and connecting the body to said support, electrical means adjacent to the Cardan joint for measuring angles of rotation between the support and the body in two orthogonal directions, said electrical means including an element mounted on said support and an element mounted on said body, photoelectric measuring means in the body for measuring the number of revolutions of the nose portion, and means for converting the number of revolutions to determine the flight distance and the air speed from the rotational speed of the nose portion and the pitch of the propeller blades, and to count the revolutions of the nose portion within one unit of time.

8 Claims, 6 Drawing Figures

INVENTOR
PETER PARTZSCH

FLIGHT MEASURING APPARATUS

This application is a continuation-in-part of copending application Ser. No. 871,759, filed May 2, 1969, which is, in turn, a continuation of application Ser. No. 505,150, filed Oct. 25, 1965, both now abandoned.

When performing measurements of flight path and flight performance, separate measuring instruments generally are employed for determining, first, the angle of incidence and the angle of sideslip and, second, for measuring the flight path and air speed. In order to obtain accurate measurements, these measuring devices must be mounted on the aircraft at a position where the air flow is undisturbed, i.e. at a distance sufficiently far away from the airplane, which may be achieved, for example, by using a supporting mast which points in the direction of flight and which is secured either to the nose of the fuselage or to the leading edge of a wing. If all of the instruments are intended to be mounted together on the same supporting mast, difficulties arise, however, since minimum distances must be maintained between them in order to prevent mutual disturbing influences. If, on the other hand, each instrument is mounted on a separate mast, additional weight and disturbing additional resistances, together with increased expense, must be accepted as a logical consequence.

Frequently, the possibility is utilized of exchanging the instruments at the mounting or securing mast and scheduling a separate flight for each measuring program. This separate measuring method cannot, however, be utilized for all flight-mechanical investigations. A particularly critical case is presented by the problem of obtaining the aforementioned flight data on a relatively small aircraft with is expendable, i.e., one which makes only one flight, terminating in the destruction thereof. Relatively small dimensions are required in this case, as are low weight and low resistance of the measuring devices. The measurements of all the data must occur simultaneously and disturbing influences between the individual measuring instruments must be eliminated. Such aircraft frequently operate over a range of very high speeds and at varying altitudes so that independence of atmospheric density is desirable, together with independence of the measuring method with regard to the mach number and Reynold's number.

Stationary devices or instruments are known in meterology which make it possible to simultaneously determine the speed and direction of airflow with a single instrument, but these instruments are not suitable for flight data measurements. The disadvantages of such instruments are the great weight, intricacy of mechanical construction, high inherent resistance, and the Reynold's number and mach number dependence thereof. Accordingly, these instruments either are not suitable for flight measurements or are useful within narrow limits only.

The present invention provides a measuring apparatus which permits the measurement of the angle of incidence, the angle of sideslip, the flight path, and the air speed with a single measuring instrument while effectively eliminating the disadvantages of heretofore known devices. Particularly a simultaneous measurement of these data is intended to be rendered possible.

The apparatus of the present invention for the simultaneous measurement of the angle of incidence, the angle of sideslip, the flight path and the air speed of an airplane comprises a spindle-shaped body, a rotating nose portion mounted thereon and being provided with propeller blades, a tail assembly at the spindle-shaped body, a bearing for connecting the spindle-shaped body with an airplane, a Cardan joint mounted at the spindle-shaped body in the center of gravity of the apparatus for connecting the spindle-shaped body with the afore-mentioned bearing, electrically-acting means within the area of the Cardan joint for measuring the relative angular position between the bearing and the spindle-shaped body in two orthogonal directions, the afore-mentioned electrical means comprising one element at the bearing and one element at the spindle-shaped body, and photoelectrically-acting measuring members within the spindle-shaped body for counting the number of revolutions of the nose portion, as well as means for representing and/or for converting the number of revolutions to determine the flight path or distance and the air speed from the rotational speed of the nose portion and the pitch of the propeller blades and to count the revolutions of the nose portion in one unit of time.

A flight measuring apparatus constructed in this manner affords the possibility of measuring with only a single measuring instrument the angle of incidence and the angle of sideslip as well as the flight path and the air speed, whereby the drag arising due to the apparatus is considerably reduced as compared to the use of a plurality of individual instruments, and transmitting members from individual measuring instruments to a single apparatus collecting the values having been measured may be dispensed with. Any inaccuracies in the measurements due to the mutual influences of individual instruments are moreover effectively eliminated thereby. A significant advantage further resides in that, with the flight measuring apparatus according to the present invention, the flow vector may be measured and indicated directly, and hence is nearly free from delays.

One embodiment of the novel flight measuring apparatus will be described hereunder in further detail taken in connection with the accompanying drawings, in which FIG. 1 shows the entire flight measuring instrument in longitudinal section;

FIG. 2 schematically illustrates the construction of the Cardan joint, in longitudinal section, with a capacitive angle measuring device;

Figure 1:
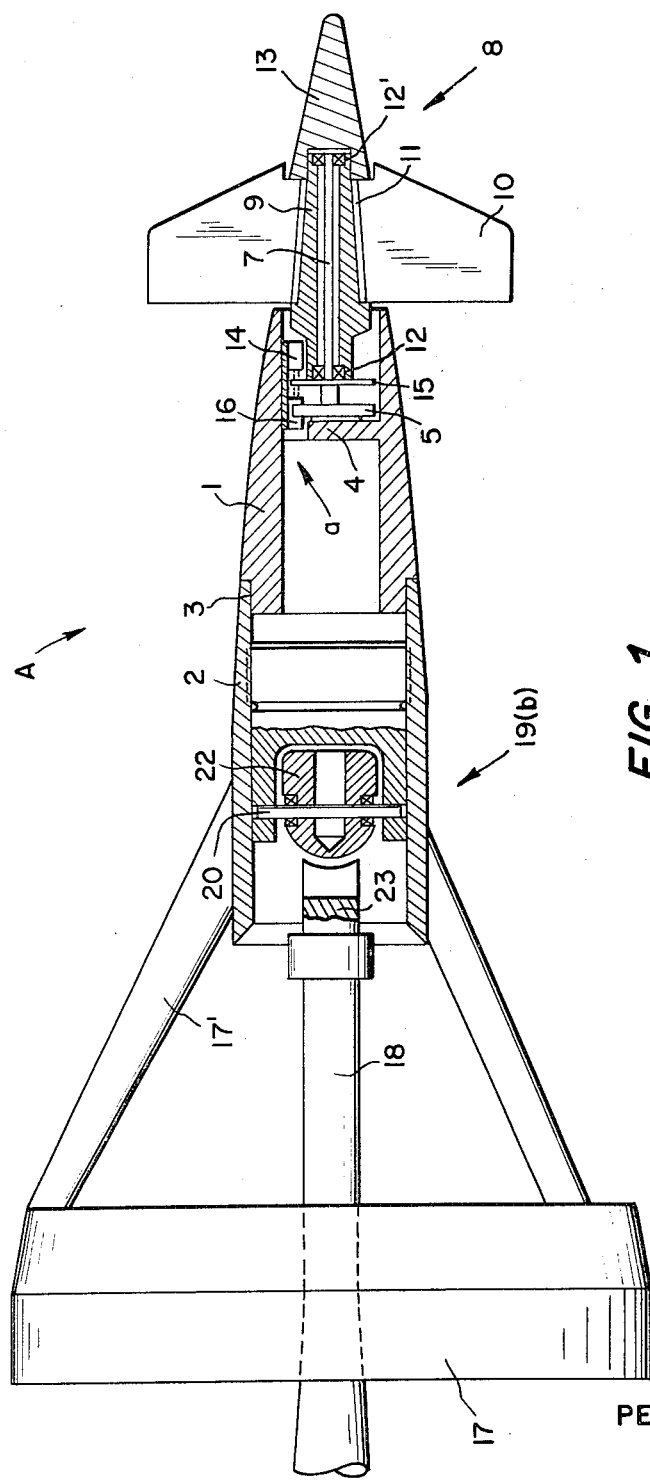

According to FIG. 1, the flight measuring instrument or apparatus comprises a spindle-shaped body A which is composed of two housing parts 1 and 2 being coaxially arranged with respect to each other. Mounted at the disassembly point 3 between the two housing parts 1 and 2 is a bayonet lock, and further provided are plug connectors for electrical transmission lines, neither the bayonet lock nor the plug connectors having been shown herein. Integrally formed with the housing part 1 is a partition 4 and rigidly secured to the latter is a mounting disc 5. The mounting disc 5 receives a stationary carrier axle 7 being positioned in the longitudinal axis of the spindle-shaped body A. A nose portion 8 is freely rotatably mounted on the carrier axle by means of roller bearings 12 and 12'. The nose portion 8 comprises a hub 9 to which the propeller blades 10 are secured, and a cone 13 which constitutes the forward end of the spindle-shaped body A and is adapted to be threaded onto the hub 9 for purposes of the mounting support of the propeller blades 10. Provided within the peripheral area of the hub 9 are profiled slide grooves or slots for receiving the propeller blades 10 so that it is possible to exchange the propeller blades for similar ones having a different pitch.

Reference symbol a has been used to identify a photoelectric measuring device being accommodated in the housing part 1. This measuring device comprises a light source 14 and a photodiode 16, as well as a perforated disc 15 which is rigidly secured to the hub 9 of the rotatable nose portion 8 and rotates between the light source 14 and the photodiode 16. Mounted at the housing part 2 of the spindle-shaped body A by way of the struts 17' is an annular tail unit 17 being concentric with respect to the spindle-shaped body A. Rigidly connected to the aircraft is a supporting tube 18 which receives in its center of gravity, by way of a Cardan joint 19, the spindle-shaped body A in a universally articulated manner. The supporting tube or mast 18 is so dimensioned in its axial extension that the flight measuring instrument is positioned at a corresponding distance from parts of the aircraft in the undisturbed flow. An electrical angle measuring device $b$ which operates on a capacitive basis, as will be more fully described hereinbelow, is in operative engagement with the Cardan joint 19 within the spindle-shaped body A.

Figure 2:
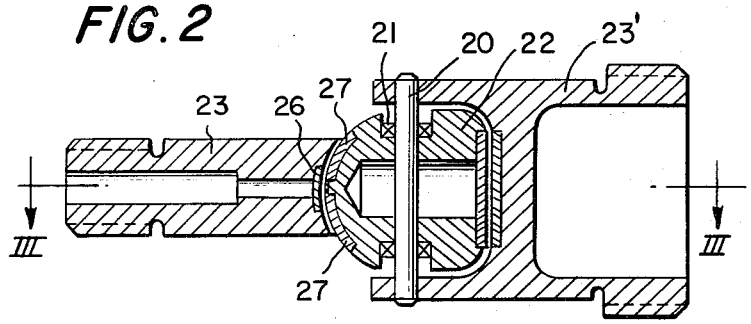
Figure 3:
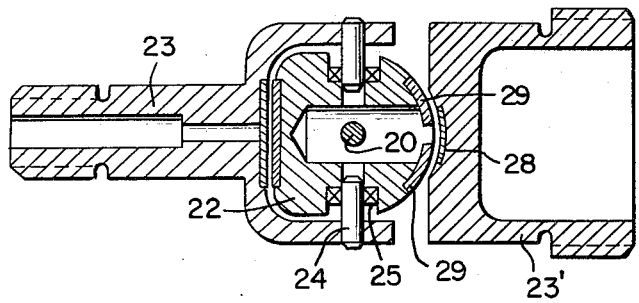
FIG. 3 is a longitudinal cross-sectional view of the Cardan joint taken along line III—III of FIG. 2.

As is apparent from FIGS. 2 and 3, the Cardan joint 19 comprises two bifurcated portions 23 and 23', an intermediate Cardan member 22, as well as two Cardan axles 20 and 24, which are positioned at a right angle with respect to each other and are rotatably mounted at the intermediate Cardan member 22 by way of bearings 21 and 25, respectively. The free ends of the Cardan axles 20 and 24, respectively, are rigidly inserted into boreholes at the bifurcated portions 23' and 23, respectively. In the present embodiment it is intended that the Cardan axle 20 be parallel to the vertical axis of the aircraft and that the axle 24 be parallel to the transverse axis of the aircraft. In this case, one movement of the spindle-shaped body A about the Cardan axle 20 corresponds to a change in the angle of sideslip, and one movement of the body A about the Cardan axle 24 corresponds to a change of the angle of incidence of the aircraft, and both movements may take place simultaneously by virtue of the Cardan joint support 19.

The afore-mentioned angle measuring device $b$ is composed of two condenser systems with the respectively coordinated condenser plates 26 and 27, and 28 and 29, and it is intended that the angle of sideslip be measured by means of the condenser system 26, 27, while the angle of incidence of the aircraft is intended to be measured by means of the condenser system 28, 29. For this purpose, the intermediate Cardan member 22 supports both the two condenser plates 27 and the two condenser plates 29. The condenser plates 26 and/or 28 being coordinated to the plates 27 and/or 29, on the other hand, are mounted at the bifurcated portion 23 and, respectively, at the bifurcated portion 23'. The two condenser systems 26, 27 and 28, 29, respectively, are connected to an indicating instrument each by way of a measuring bridge in known manner, which will be further explained hereinafter. In case of a change in the position of the condenser plates 26 and 27 and/or 28 and 29 with respect to each other, there will occur a change in the capacitance of the plate systems 26, 27 and/or 28, 29 in a first approximation proportional to the deflection of the spindle-shaped body A about the zero position thereof. The respectively coordinated electrical lines have not been shown herein in the interest of clarity of the drawing, and also since the circuits employed are known in the art.

Figures 4, 5:
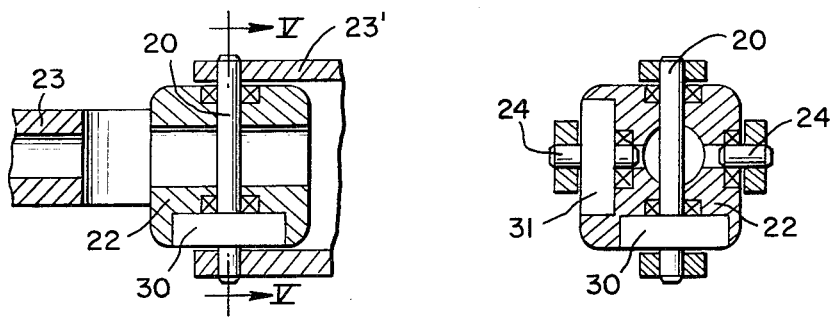
FIG. 4 shows a modified embodiment, in longitudinal section, of the angle measuring device at the Cardan joint which operates with potentiometer taps.
FIG. 5 is a cross-sectional view through the Cardan joint taken along line V—V of FIG. 4.

FIGS. 4 and 5 illustrate, instead of the capacitively-operated angle measuring device $b$ with the Cardan joint 19, an angle measuring device that works with potentiometers. The potentiometers 30 and 31 are so coupled with the Cardan axles 20 and 24, respectively, that in case of a deflection of the spindle-shaped body A with regard to the supporting mast or tube 18 being rigidly mounted on the aircraft about either one, or about both Cardan axles 20 and/or 24, a resistance change proportional to the deflection is brought about. The potentiometers and the taps thereof also may be mounted at other points suitable therefor.

Figure 6:
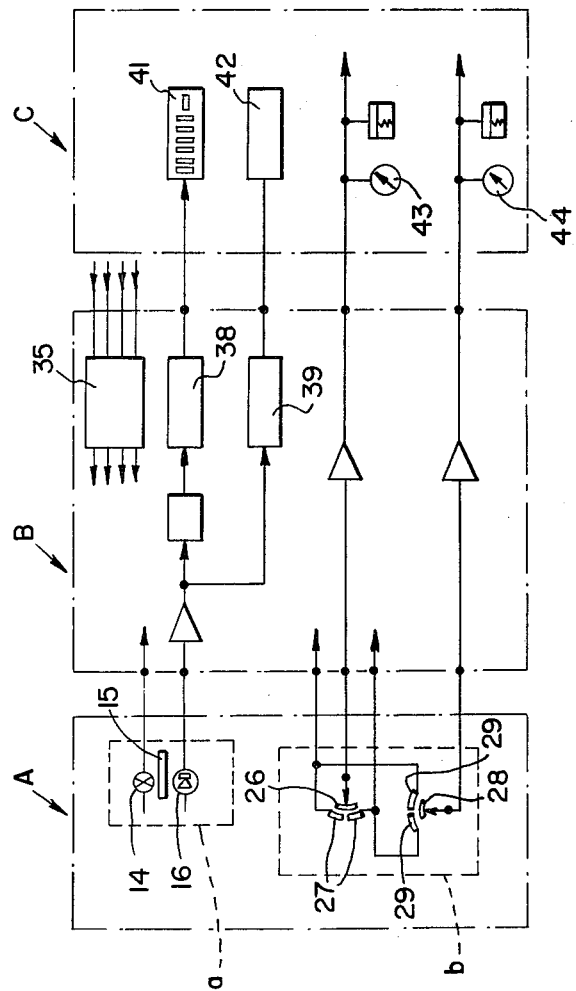
FIG. 6 illustrates in a block diagram the electrically-acting part of the flight measuring instrument according to FIGS. 1 to 4.

FIG. 6 shows in a block diagram the electrically-acting part of the flight measuring apparatus, in which A identifies again the spindle-shaped body of the flight measuring instrument or apparatus, $a$ designates the photoelectric measuring device, and $b$ designates the angle measuring device. Reference symbol B represents a calculator or computer which is connected with the spindle-shaped body A and, respectively, with the photoelectric measuring device $a$, and reference symbol C identifies an indicating instrument. As has already been mentioned, the photoelectric measuring device $a$ contains the light source 14, the photodiode 16, as well as the perforated disc 15 being positioned between these two members. Moreover, the angle measuring device $b$ contains the condenser systems 26, 27 and 28, 29, respectively, which are directly connected to the indicating device C. The calculator B contains the current supply 35 for the electrical device, the counting device 38 connected to the photodiode 16, as well as a differentiator 39 which is equally adapted to be controlled by way of the photodiode 16. The indicating device C comprises an indicator 41 connected to the counting device 38 of the calculator or computer B for the flight path and the air speed, and an indicator 42 being connected to the differentiator 39 of the calculator B for the acceleration in the direction of the flight path. The indicating device C contains, furthermore, an indicator 43 adapted to be controlled by means of the condenser system 26 and/or 27 and represents the indication for the angle of incidence, and in addition thereto an indicator 44 adapted to be controlled by means of the condenser system 28, 29 for the indication of the angle of sideslip.

The operation of the flight measuring instrument or apparatus proposed by the present invention will now be further described hereinafter.

During the flight of the aircraft, the spindle-shaped body A is exposed to onflowing air and becomes oriented with the aid of the annular tail unit or assembly 17 thereof and with the aid of the Cardan joint 19 in the flow so that the spindle-shaped body A points at all times in the direction of the flow, independently of the flight attitude of the aircraft. Due to the onflowing air, the nose portion 8 is caused to rotate with the aid of the propeller blades 10 having a specific pitch. As a result thereof, electrical impulses are produced by way of the perforated disc 15, being rigidly connected with the nose portion 8, in conjunction with the light source 14 and the photodiode 16, which impulses are supplied via electric lines to the counting device 38 of the calculator B and transmitted to the indicator 41 of the indicating device C. It is possible to read on the indicator 41 the instantaneous flying speed and the distance covered along the flight path. The flying distance is determined on the basis of the pitch of the propeller blades times the number of revolutions of the nose portion 8. The measurement of the flight path or course also may be carried out, however, directly without the calculator B shown in FIG. 6 with the aid of tables or curves from the number of revolutions of the rotating nose portion 8. To each revolution of the nose portion 8 corresponds — due to the existing pitch of the propeller blades 10 — a specific distance covered. When the number of revolutions of the nose portion 8 is continuously counted during the flight of the aircraft, and the number of revolutions of the nose portion 8 are in each case multiplied during the reading with the pitch of the propeller blades 10, the flight covered until then may be determined with the aid of the afore-mentioned tables or curves. The same holds true also for the determination of the instantaneous flying speed. The distance is known from the pitch of the propeller blades 10 multiplied by the number of revoltuions of the nose portion 8. If the distance is measured within a corresponding unit of time, the instantaneous air speed or flying speed is found by dividing the distance by a selected unit of time, for example one second. Reading of this value equally may be effected with prepared tables or curves. Additionally, with the aid of the calculator B and, respectively, the differentiator 39 contained within the calculator in conjunction with the photoelectric measuring device $a$, it is possible to determine the acceleration of the aircraft in the direction of the flight path. In this case, the increase or decrease of the number of impulses of the photoelectric measuring device $a$ is determined within a corresponding unit of time, and the acceleration is found on the basis of the speed divided by the time. In other words, it is possible to determine from the increase and/or decrease of the flying distance within a specific period of time, the acceleration or the deceleration.

The angle measuring device $b$ operates so that a change of the capacitances takes place in a first approximation proportional to the relative movement by means of the condenser systems 26, 27 and/or 28, 29 in case of a relative movement between the supporting mast or tube 18 and the spindle-shaped body A. The angular values and, respectively, the capacitance change are supplied by the angle measuring device b of the spindle-shaped body A to the indicating instrument C and are represented by the indicator 43 and/or 44 in angular values. In the embodiment as shown according to FIGS. 1 to 3 and FIG. 6, the angle of sideslip is measured by means of the condenser system 26, 27, as already mentioned, and the angle of incidence of the aircraft is measured by means of the condenser system 28, 29.

As compared to determinations of speed based on measurements of pressure, the method of effecting the measurement on the basis of rotation by means of a rotatable nose portion with propeller blades affords the advantage that it is independent of changes in altitude as long as the aerodynamic forces do not become so small that they are of the same order as the bearing frictional forces.

It is particularly important for the accuracy of the path and speed measurements that the bearing friction of the rotatable nose portion 8 be small and that the direction of air flow against the propeller blades 10 occur exactly in the direction of the longitudinal axis of the measuring device. The exterior configuration of the spindle-shaped body is important to make it independent of viscosity and compressibility influences. These requirements have been taken into consideration in the present invention in an advantageous manner. The speed or number of revolutions is measured without reactive effect with the aid of the photoelectrically-acting measuring device b so that the rotational friction of the nose portion 8 may be maintained very small. The longitudinal axis of the spindle-shaped body A is precisely adjusted in the air flow direction by means of the annular tail assembly 17 which is mounted behind the Cardan joint. The annular tail assembly thus provides large directional forces and good damping properties with only a small span. The configuration of the spindle-shaped body A enhances the disturbance-free direction of air onflow against the propeller blades also within the compressible flying speed range. The disassembly point 3 between the housing part 1 and the housing part 2 of the spindle-shaped body A not only makes possible a ready access to the Cardan bearing 19 and the mounting partition 4, but also permits an exchange of the entire forward portion inclusive of the housing part 1 if measurements are to be effected in the high supersonic speed range, for example, where a different contour is required.

In the case of malfunction of the photoelectric unit or in case of damage to the propeller blades 10, a possibility of merely detaching the nose portion 8 connected to the mounting disc 5 is advantageous. Damaged propeller blades 10 may be pulled out by unscrewing the cone 13 from the hub 9 of the nose portion 8, and may be exchanged for other propeller blades. The accuracy in different speed ranges may thus also be improved in a simple manner by using propeller blades with different angles of incidence and varying pitch being optimal for the respective range.

The problem of the angular taps for the measurement of the angle of incidence and angle of sideslip is solved with the smallest space requirements by virtue of the angle measuring device 26, 27 and 28, 29, respectively, being used without additional drag or resistance to flow and without an adverse increase of friction in the Cardan joint 19. The accurate adjustment of the longitudinal axis of the apparatus by means of the annular tail assembly 17 is also advantageous for the angular measurements. In view of the particularly simple and sturdy tap by means of potentiometers 30 and/or 31 according to the construction or embodiment shown in FIGS. 4 and 5, the frictional resistance is practically negligible in the apparatus available at the present time. The errors in the angular measurements may be maintained smaller than 0.2° over the entire measuring range. The capacitive measurement according to the construction or embodiment shown in FIGS. 1 to 3 and 6 is free from reactive effects.

Thus, the construction of the present invention provides the following advantages: simultaneous accurate measurement of the angle of incidence, angle of sideslip, flight path, flying speed and acceleration in the direction of the flight path or course without mutual interference with only a single measuring instrument with small overall dimensional requirements, and low drag or resistance to flow. The flight measuring instrument or apparatus according to the present invention is adapted to be used within a wide speed range and is largely independent of changes in altitude, mach number and Reynold's number, and a low-resistance configuration of the measuring device together with the supporting mast 18 being rigidly mounted at the airplane is effectively assured thereby.

It will be obvious to those skilled in the art that many modifications may be made within the scope of the present invention without departing from the spirit thereof, and the invention includes all such modifications.

What is claimed is:

1. An apparatus for simultaneously measuring the angle of incidence, the angle of sideslip, distance covered along a flight path and air speed of an aircraft which comprises a body, a rotatable nose portion mounted on the body and having propeller blades thereon, a tail assembly mounted on the body, a support for connection to an associated aircraft, a Cardan joint mounted in the body in the center of gravity of the apparatus and connecting the body to said support, electrical means adjacent to the Cardan joint for measuring angles of rotation between the support and the body in two orthogonal directions, said electrical means including an element mounted on said support and an element mounted on said body, photoelectric measuring means in the body for measuring the number of revolutions of the nose portion, and means for converting the number of revolutions to determine the flight distance and the air speed from the rotational speed of the nose portion and the pitch of the propeller blades, and to count the revolutions of the nose portion within one unit of time.

2. An apparatus according to claim 1 in which said last-named means is a computing device connected in series after the photoelectric measuring means for determining the flight distance and the air speed.

3. An apparatus according to claim 1 in which the tail assembly has an annular configuration and is concentrically mounted on the body.

4. An apparatus according to claim 1 in which the Cardan joint includes two axles, one of said axles adapted to be mounted parallel to the vertical axis of an associated aircraft, the other of said axles adapted to be mounted parallel to the transverse axis of an associated aircraft.

5. An apparatus according to claim 1 wherein said electrical means includes condenser systems having relatively movable plates, said elements comprising plates of said condenser systems.

6. An apparatus according to claim 1 wherein said electrical means includes potentiometers having relatively movable tap parts and resistance parts, said elements comprising parts of said potentiometers.

7. An apparatus according to claim 1 wherein a forward portion of the body is detachable and includes said rotatable nose portion, an axle and a portion of said photoelectric measuring means.

8. An apparatus to claim 1 including means on the rotatable nose portion whereby the blades may be replaced with others of different configuration.

* * * * *